Sept. 24, 1963 E. H. RUDD 3,104,589
HYDRAULIC CONTROL
Filed Nov. 14, 1960 3 Sheets-Sheet 1

INVENTOR.
EDWARD H. RUDD
Watts, Edgerton, Pyle, &
Fisher Attorneys

INVENTOR.
EDWARD H. RUDD

Watts, Edgerton, Pyle &
Fisher Attorneys

Sept. 24, 1963 E. H. RUDD 3,104,589
HYDRAULIC CONTROL
Filed Nov. 14, 1960 3 Sheets-Sheet 3

INVENTOR.
EDWARD H. RUDD
BY
*for Watts, Edgerton, Pyle, & Fisher*
Attorneys

United States Patent Office

3,104,589
Patented Sept. 24, 1963

3,104,589
HYDRAULIC CONTROL
Edward H. Rudd, Wooster, Ohio, assignor to Flo-Tork,
Inc., Orrville, Ohio, a corporation of Ohio
Filed Nov. 14, 1960, Ser. No. 68,715
13 Claims. (Cl. 91—172)

This invention pertains to hydraulic actuators, and more particularly to mechanisms for converting hydraulic pressure to alternate rotary motion.

United States Patent No. 2,844,127, issued July 22, 1958 to Carl Steiner, and entitled, Fluid Pressure Torque Converter, discloses a mechanism for converting hydraulic pressure to alternate rotary motion. The patented device has a housing provided with a pair of spaced piston chambers and central gear chamber disposed between and in communication with the piston chambers. A piston with an integrally formed rack is reciprocably carried in each of the piston chambers. A gear is disposed in the gear chamber and in engagement with the rack of each of the pistons. The gear is journaled in the housing for rotation when driven by the pistons.

Fluid under pressure may be introduced at diagonally opposite ends of the cylinders to drive the pistons in opposite directions and cause the gear to rotate.

The referenced Steiner patent claims several features, including the provision of a self-agitating lubricating chamber of varying cross-section, use of the end seals on the piston ends remote from the pressure end as backups for the end seals at the pressure end, and formation of complemental walls on the cylinders and pistons to serve as bearings which absorb lateral thrust.

With the present invention all of these listed features and others are obtained in a hydraulic actuator. In addition, an actuator is provided in which one may selectively obtain a maximum amount of rotation in either direction, say 180° for example, or a lesser amount of travel in either direction, 90° for example. This selective degree of travel is obtained by delivering fluid under pressure through a selected one of two fluid passage systems or by simultaneously delivering fluid under pressure through both systems.

With this mechanism one of the rack pistons is a solid piston formed in the manner taught in the referenced patent. The other of the rack pistons is a segmental piston which includes spaced end piston cups which telescope over the ends of a central portion. The segmental piston chamber has enlarged portions which are spaced from one another and at either end of the chamber. Each of the piston cups is disposed in one of these enlarged portions. The length of the enlarged portion determines the amount of cup travel and with it the amount of rotation obtained when the lesser of the two amounts of rotation is selected.

When fluid under pressure is introduced through one of the fluid passage systems, the pressure is introduced at one end of the solid piston. When pressure is introduced through only the second of the two passages, fluid is introduced under pressure at the other end of the solid piston. When fluid under pressure is supplied to only one of the passage systems, the segmental piston chamber is not energized. Thus the solid piston drives the gear and the other piston. Since the chamber which houses the solid piston is of a uniform cross-sectional configuration, the solid piston can travel the entire length of its chamber in the selected direction.

When fluid under pressure is supplied to both passage systems, it is supplied to both ends of both pistons and therefor the solid piston is in a balanced and neutralized condition. At the commencement of introduction of pressure, the pistons will be at one extremity of their travel. Since the piston cups are limited in their travel by the length of the enlarged portions of their chamber, one of the piston cups will be out of contact with the central portion of the segmental piston.

When fluid under pressure is supplied by both passage systems it acts against both of the piston cups. Since one is in contact with, and one is out of contact with the central portion, the pressure will drive the central portion until it engages both piston cups. At this time the system will be in a fully pressurized and neutral condition having traveled the lesser distance, again 90° in the sample cited.

The selective introduction of fluid under pressure to the proper piston ends when either one or both of the passage systems is energized, provides one of the outstanding features of this invention. To accomplish this each of the passage systems is in direct communication with one end of the solid piston chamber. A pair of valve members are provided, each of which has a reciprocable valve body. Each valve body includes a large pressure face tending to open the valve and a small pressure face tending to close the valve. When fluid under pressure is supplied to both faces the differences in area of these two faces causes the valve body to open. The application of fluid pressure against only one of these faces will cause the valve body to either open or close, depending upon which face has pressure applied against it.

During maximum travel, one of the valves is open to vent one end of the segmental piston chambers and allow fluid to escape from the chamber. When both pressure systems are open the unbalanced condition causes both valve bodies to open and thereby energize both ends of the segmental piston, causing movement as described above.

Accordingly, one of the principal objects of this invention is to provide a novel and improved hydraulic actuator which will selectively provide either a maximum amount of rotation in either direction or a pre-selected lesser amount of rotation in either direction.

A related object of the invention is to provide a hydraulic actuator affording the described selection of extent of rotation in which the selection is obtained by controlling two hydraulic pressure supply systems.

Another object of the invention is to provide a novel and improved actuator with which a selected amount of rotation can be obtained, which actuator utilizes standard, commercially available valves thereby providing a mechanism which is simple and inexpensive to manufacture.

Another object of the invention is to provide a hydraulic actuator with selective amounts of rotation wherein the same torque output is the same for all rotation even though different amounts of rotation may be selected.

Other objects and a fuller understanding of the invention may be had by referring to the following description and claims taken in conjunction with the accompanying drawings in which:

Figure 1:
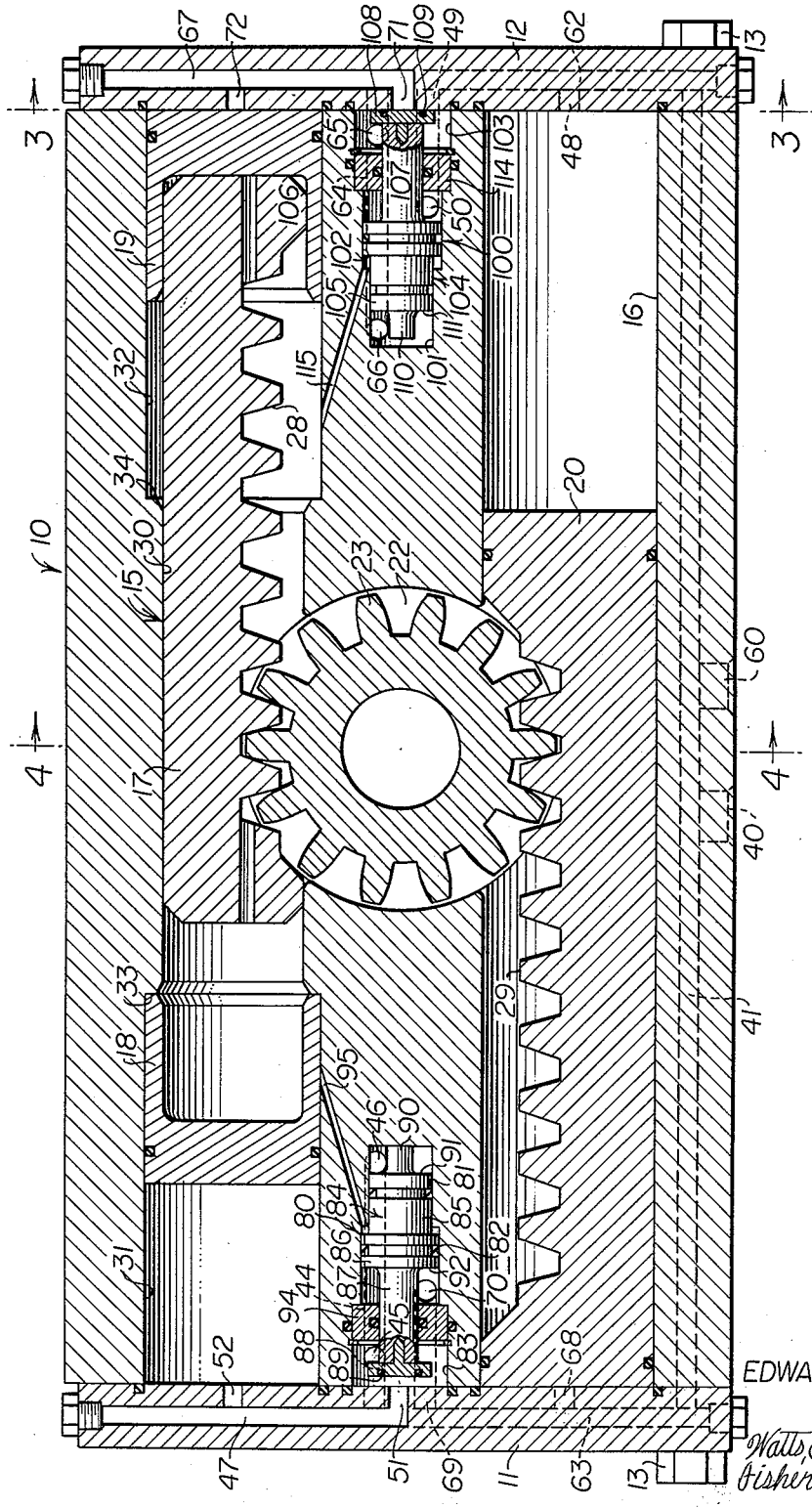
FIGURE 1 is a sectional view of the device as seen from a longitudinal plane of cross section showing the mechanism in one extreme travel position.

Referring now to the drawings, a housing central portion 10 is provided. A pair of spaced end caps 11, 12 are fixed to the housing central part 10, as by bolts 13. The housing central part 10 and the end caps 11, 12 together define a housing for the fluid actuator. The housing includes spaced piston chambers 15, 16. For clarity of illustration and understanding the piston chamber 15 will be referred to as the segmental piston chamber, while the chamber 16 will be referred to as the solid piston chamber.

A segmental piston composed of a central rack portion 17 and spaced end piston cups 18, 19 is disposed in the segmental chamber 15. A solid piston 20 is disposed in the solid piston chamber 16.

Figure 4:
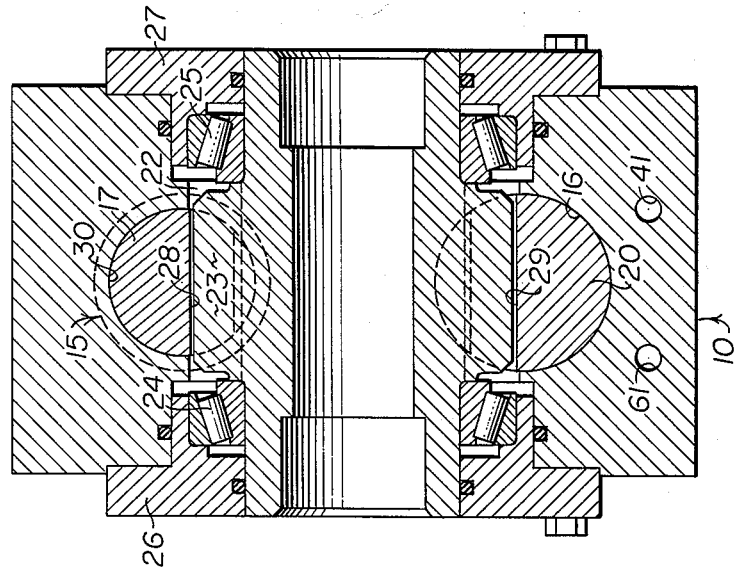
Figure 3:
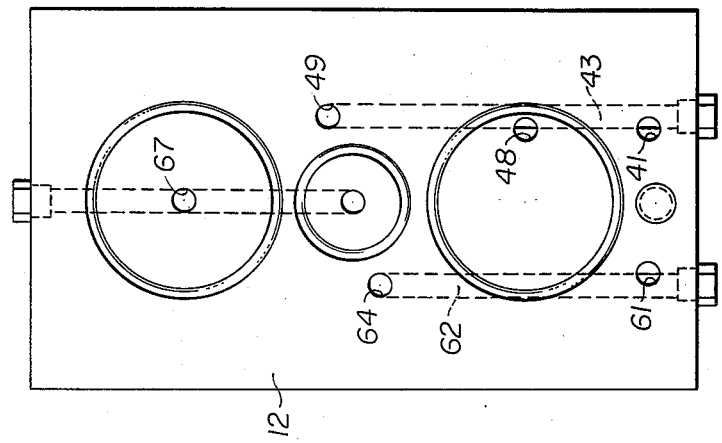
FIGURE 3 is a sectional view of the device as seen from the plane indicated by the line 3—3 of FIGURE 1 showing in plan view the inner surface of one of the end caps and in dotted and solid lines the fluid passages formed in the end cap; and, FIGURE 4 is a sectional view of the device as seen from the plane indicated by the line 4—4 of FIGURE 1.

A gear and lubricant chamber 22 is formed in the center of the housing. The gear chamber 22 is in communication with the piston chambers 15, 16. A pinion gear 23 is journaled in the housing and disposed in the gear chamber. As is best seen in FIGURE 4, the pinion gear 23 is journaled in a pair of tapered roller bearings 24, 25. The roller bearings are respectively carried by gear chamber closure caps 26, 27. The central rack portion 17 and the solid rack piston 20 respectively include racks 28, 29 which engage the pinion gear 23 and which may be integrally formed.

The segmental piston chamber 15 includes a central bore 30 which is preferably cylindrically contoured. The segmental chamber 15 includes enlarged and spaced end portions 31, 32 which are each preferably cylindrically countoured and larger than the central portion 30. The enlarged end portions 31, 32 are of an equal diameter which is the same as the diameter of the solid chamber 16. The enlarged portions 31, 32 are in axial alignment with one another and the central portion 30. The piston end cups 18, 19 are disposed respectively in the enlarged portions 31, 32. The enlarged portions 31, 32 respectively terminate at inner end walls 33, 34. As will become more apparent from the description below, these end walls 33, 34 act as stops to limit the inward travel of the cups 18, 19 respectively.

The energization of this mechanism is controlled by two fluid pressure conduction systems. For clarity of illustration and understanding the first fluid passage system is delineated by the numerals 40 through 52, while the second fluid passage system is delineated by the numerals 60 through 72. Thus, a given number denotes a portion of the first system, where a corresponding number which is larger by 20 delineates the corresponding part in the second system. Thus, inlet port 40 is in the first system while inlet port 60 is in the second.

The inlet port 40 communicates with a through passage 41 of the housing central part 10. A corresponding through passage 61 extends from the end cap 11 to the end cap 12. The passage 41 communicates with transverse passages 42, 43 in the end caps 11, 12 respectively. The transverse passage 42 in the end cap 11 communicates with a cross passage 44 which opens into a valve chamber 80 at openings 45, 46. Another transverse end cap passage 47 extends from a port 51 in the valve chamber 80 to a port 52 in the left-hand end, as seen in FIGURE 1, of the segmental chamber 15.

Similarly a transverse passage 62 in the end cap 12 communicates through a cross passage 64 with inlets 65, 66 into a second valve chamber 100. A transverse passage 67, similar to the passage 47, connects the valve chamber 100 through port 71 with the righthand end of the segmental chamber 15 through 72, as seen in FIGURE 1.

Another transverse passage 43 of the first pressure system extends upwardly through the end cap 12 and communicates through a port 48 with the righthand end of the solid piston chamber 16. Another cross passage 49 connects the transverse passage 43 with an outlet 50 in the valve chamber 100.

A transverse passage 63 corresponding to the passage 43 extends upwardly in the end cap 11. A port 68 connects the passage 63 with the lefthand end of the solid piston chamber 16. Another cross passage 69 connects the riser passage 63 with an outlet port 70 in the valve chamber 80.

The valve chamber 80 is comprised of a deep bore 81, an intermediate counter bore 82 and a large end counter bore 83. The valve chamber 100 is similarly composed of a bore 101, an intermediate counter bore 102, and a large end counter bore 103. Valve bodies 84, 104 are respectively disposed in the valve chambers 80, 100. The valve body 84 has a first cylindrical portion 85 which is in a close fluid sealing fit with the bore 81. The valve has a second and enlarged cylindrical portion 86 which is in a close fluid sealing fit with the intermediate counter bore 82. The valve body 84 also has an elongated stem 87 which extends through the large counter bore 83 and terminates at a valve head 88. The valve head 88 has an annular gasket 89 which selectively circumscribes and closes a valve outlet port 51 which communicates with the transverse passage 47.

Similarly, the valve member 104 has cylindrically contoured portions 105, 106 which are disposed in closely fitting relationship respectively with the bore 101 and the intermediate counterbore 102. An elongated stem 107 projects through the large counter bore 103, terminating at a valve head 108 with a gasket 109 which seals outlet port 71.

The valve member 80 includes a rearwardly extending stop projection 90. The valve member 80 includes an annular radially extending pressure face 91 which extends from the perimeter of the stop projection 90 to the cylindrical portion 85. This annular pressure face 91 is of a cross sectional area less than the cross sectional area of an oppositely directed annular pressure face 92. This second annular pressure face extends radially from the stem 87 outwardly to the larger cylindrically contoured portion 86. A corresponding stop projection 110 and corresponding pressure faces 111, 112 are provided on the valve member 104.

Annular sealing rings 94, 114 are respectively disposed in the larger counter bores 83, 103. The sealing rings 94, 114 are respectively in sliding and sealing engagement with the cylindrically contoured valve stems 87, 107.

Pressure bleed passages 95, 115 respectively extend from the intermediate counter bores 82, 102 to the segmental chamber 15. These bleed passages 95, 115 prevent entrapment of fluid in the space between the enlarged cylindrical parts 86, 106 and the inner ends of the intermediate counter bores 82, 102 when the valve bodies 84, 104 are reciprocated in their respective bores. Bleed passages 120, 121 are formed at the respective ends of the central rack portion to permit lubricant to pass to and from the varying spaces between the cups 18, 19 and the central portion 17.

Operation

Let us first consider the shifting of the mechanism from the position shown in FIGURE 1 to its opposite and corresponding position with the respective rack pistons at their opposite travel extremes. To accomplish this, the first fluid pressure system is de-energized while fluid under pressure is introduced into the second fluid system. Thus, fluid under pressure is passed through the inlet port 60 and into the through passage 61. This fluid is conducted through the end cap 11 by transverse passage 63 through the port 68 and into the solid piston chamber 16. Fluid coming in this port acts against the lefthand end of the solid piston 20, driving it to the right, as seen in FIGURE 1. Simultaneously, the fluid under pressure will be transmitted through the cross passage 69 to the outlet port 70 in the valve chamber 80. Since the first pressure system is de-energized, the ports 45, 46 will be exhaust ports so there is no pressure applied against the face 91. Pressure supplied by the port 70 is in the annular chamber defined by the intermediate counter bore 82, the valve stem 87, the annular sealing ring 94 and the pressure face 92. The pressure in this chamber will exert pressure against the face 92 and shift the valve body 84 to the right, as seen in FIGURE 1, until the stop 90 strikes the end of the bore 81. Thus, pressure supplied through the port 70 shifts the valve member 84 to the position shown in FIGURE 1.

Simultaneously, fluid under pressure is conducted from the through passage 61 through the transverse passage 62 in the end cap 12 to the cross passage 64. The cross passage conducts the fluid under pressure to both the outlet port 65 and the outlet port 66. Here the outlet port 50 is an exhaust port. Since there is no pressure at the port 50, the pressure introduced through the port 66 and acting against the pressure surfaces 111 will shift the valve body 104, closing off the port 71.

With the first system de-energized as indicated, fluid is exhausted from the lefthand end of the segmental chamber 15. This fluid flows through the port 52, the passage 47, the port 51, to and through the port 45 into the cross passage 44. Fluid also exhausts through the port 46 to the passage 44. Fluid then exhausts through the passages 42 and 41 and out the main port 40. Fluid simultaneously exhausts from the righthand end of chamber 16 through the port 48, the passage 43 into the passage 41.

The mechanism as seen in FIGURE 1 of the drawings is in a position where the solid rack 20 is commencing its stroke from left to right. So long as pressure is supplied through the second pressure system, this stroke will continue until the piston 20 strikes the righthand end cap 12. This lineal shifting of the solid piston 20 will, of course, cause rotation of the gear 28 which, in turn, will cause the central portion 17 of the segmental piston to travel to the left. The central portion 17 will pick up the end cap 18 and shift it to the lefthand extreme position in the segmental chamber 15.

When the second pressure system is de-energized and the first is energized, the reverse of the previously described happenings occurs. Thus, the valve body 84 will be shifted to the left by pressure introduced through port 46, while the valve body 104 will also be shifted to the left by pressure introduced through port 50. Pressure introduced through port 48 will drive the piston 20 to the left and the central portion 17 to the right. This will shift the cup 19 back to its righthand extreme position, if it is not already in that position.

When the lesser, pre-selected amount of rotation is desired, both pressure systems are energized. In the example shown in the drawings, the enlarged portions 31, 32 of the segmental chamber 15 are of a length which is equal to the total amount of travel obtainable with the solid piston 20. The end cups, on the other hand, are each equal to one-half of the length of their respective enlarged portions. Thus, in the preferred and disclosed arrangement, the maximum cup travel is one-half the maximum travel of the solid rack 20.

When fluid is introduced through both the inlet port 40 and the inlet port 60, the pressure will be supplied through both the right and lefthanded ports 48, 68 of the solid piston chamber 16. Thus, pressure is supplied to both ends of the solid piston 20. Since pressure is supplied to both ends of the solid piston 20, the solid piston 20 will not move under fluid pressure exerted on its ends.

Figure 2:
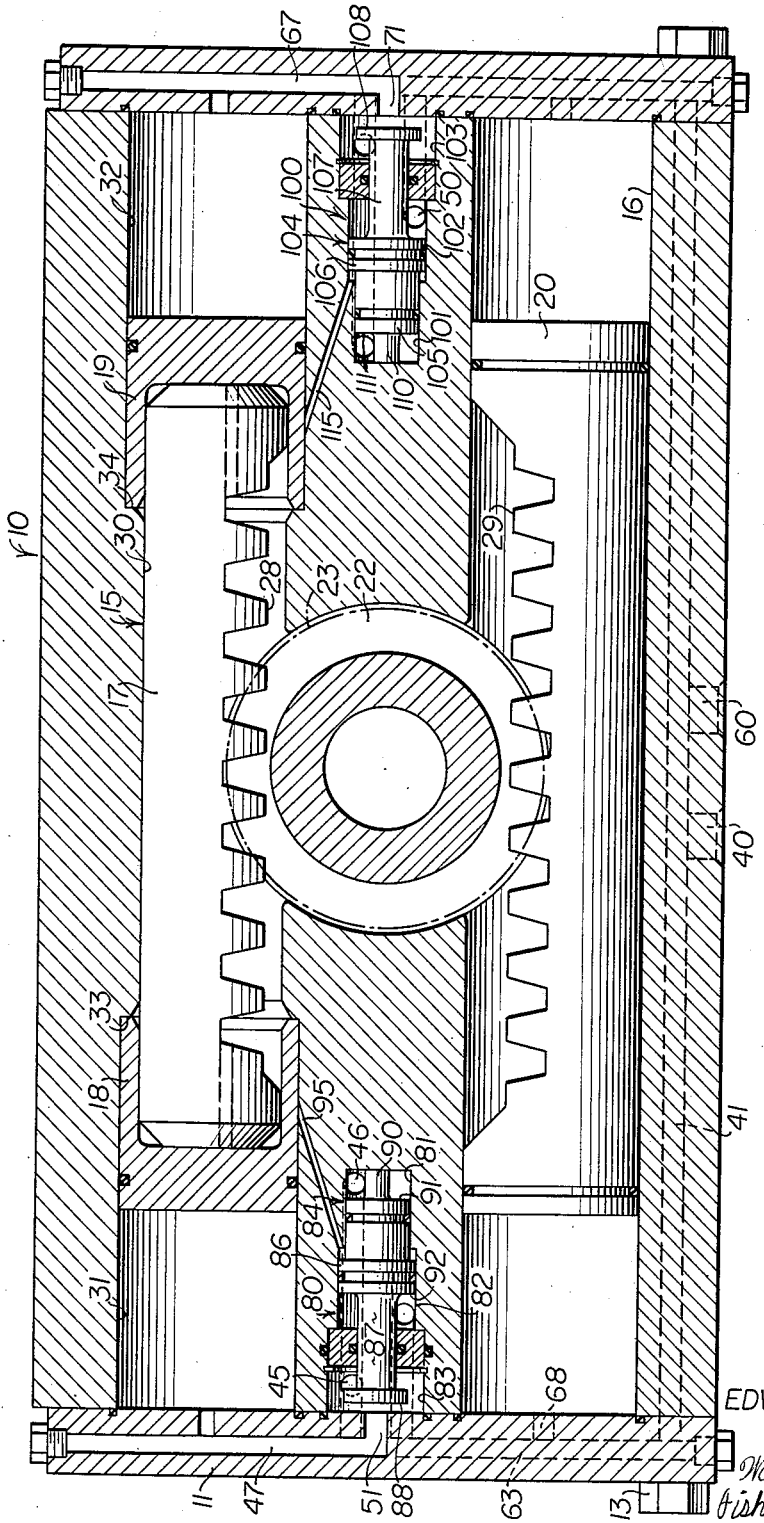
FIGURE 2 is a view corresponding to FIGURE 1 but showing the device in a position after travel through its lesser predetermined amount of rotation.

Since fluid under pressure will be introduced through both the port 70 and the port 46, and since the area of pressure surface 92 is greater than that of 91, the valve body 87 will be shifted to its righthand position shown in FIGURES 1 and 2. Similarly, since pressure is introduced through both port 50 and the port 66 and the area of the pressure surface 112 is greater than that of 111, the righthand valve member 104 will shift to the left to the open position shown in FIGURE 2. With both valves open, pressure will be introduced to both ends of the segmental chamber 15. Since there is pressure in both ends of the segmental chamber, both the cups 18 and 19 will be driven to their inner extremities of travel against the stops 33, 34. Since the cup 18, as seen in FIGURE 1, is out of contact with the central piston portion 17, its movement will have no effect on the mechanism. However, since the cup 19 is in engagement with the central portion 17, it will drive the central piston portion 17 to the left from the position shown in FIGURE 1 until it is substantially against the cup 18, at which time the entire system will be in a balanced condition and no more movement will occur.

If the total rotation obtained with maximum travel of the solid piston is 180°, and in the disclosed and preferred arrangement the travel by actuating the upper segmental piston is one-half that of the lower, then obviously it will be 90°. From the preceding description it will be seen that to move the gear 23 through 90° in a counterclockwise direction, one would energize both pressure systems. To move the mechanism 90° from the opposite travel extreme from that shown in FIGURE 1, one would also energize both pressure systems and the occurrences reverse from the previously described occurrence will happen.

If the mechanism is in the central position shown in FIGURE 2, 90° movement is obtained by energizing one or the other of the systems to cause the lower solid rack piston 20 to drive the mechanism. Thus, if the first pressure system is energized, fluid introduced through the port 48 will drive the solid piston 20 from the position shown in FIGURE 2 to that shown in FIGURE 1. Conversely, if fluid under pressure is introduced through the port 68, it will drive the mechanism 90° from the position shown in FIGURE 2 to the position which is the opposite of that shown in FIGURE 1.

From the preceding description it will be seen that one may, by the simple expedient of controlling two pressure systems, obtain either 90° or 180° of rotation in either direction. Further, this is obtained through the use of a valving system which is made of standard and commercially available parts so that no "special" machinery is necessary, thereby providing a very inexpensive and simple mechanism.

Another of the advantages of the described mechanism for obtaining selectively one of two amounts of rotation is that the torque output of the rotating member is the same in any condition. This is true because only one end of one of the pistons is energizing the mechanism at any given time. The uniform torque is obtained because the cups 18, 19 are of the same diameter as the ends of the solid pistons 20 and the solid piston bore 16.

Although the invention has been described in its preferred form with a certain degree of particularity, it is understood that the present disclosure of the preferred form has been made only by way of example and that numerous changes in the details of the construction and the combination and arrangement of parts may be resorted to without departing from the spirit and scope of the invention as hereinafter claimed.

What is claimed is:

1. In a hydraulic actuator having a rotatable gear element journaled in a housing element having first and second piston chambers on two sides of the gear element and first and second rack piston elements in the piston chambers and engaged with the gear element, the combination of, passages in the housing element communicating with the chambers, fluid energized valve means for control by fluid under pressure applied to two systems and connected to the passages for controlling the flow of fluid under pressure through said passages, said valve means having a first position to cause movement of said piston elements in said chambers for maximum travel in one direction, said valve means having a second position to cause movement of said piston elements in said chamber for maximum travel in a direction opposite to said one direction, said valve means having a third position to cause movement of the said piston elements in said chambers respectively in opposite directions each for a lesser amount of travel, and one of said elements including means forming stops to limit the travel of the piston elements in either direction when the valve means is in the third position to limit the piston element movement to such lesser amount of travel.

2. In a hydraulic actuator having a rotatable gear journaled in a housing having first and second piston chambers on two sides of the gear and first and second rack pistons in the first and second chambers respectively and engaged with the gear, the combination of, passages in the housing communicating with the chambers, fluid energized valve means for control by fluid under pressure supplied to two systems and connected to the passages for controlling the flow of fluid under pressure through said passages, said valve means having a first position to cause movement of said pistons in said chambers for maximum travel in one direction, said valve means having a second position to cause movement of said pistons in said chambers for maximum travel in a direction opposite to said one direction, said valve means having a third position to cause movement of the said pistons in said chambers respectively in opposite directions for a lesser amount of travel, said first piston having a plurality of segments, and said first chamber including spaced stops each abuttable with one of the segments to limit the travel of the pistons in one direction when the valve means is in the third position to limit the piston movement to such lesser amount of travel.

3. The device of claim 2 wherein the first piston segments are a central portion and spaced end cups each telescoped over one end of the central portion and abuttable against one of the chamber stops.

4. In a hydraulic actuator having a rotatable gear journaled in a housing having first and second piston chambers on two sides of the gear and first and second rack pistons in the piston chambers and engaged with the gear, the combination of, first and second passage systems in the housing communicating with the piston chambers, the housing including spaced valve chambers each connected to one of the passage systems, valve members in the valve chambers for controlling the flow of fluid under pressure through said passage systems, said valve members each having open and closed positions, one of the valves being open and the other closed to cause movement of said pistons in said piston chambers for maximum travel in one direction, said one valve member being closed and said other valve member open to cause movement of said pistons in said piston chambers for maximum travel in a direction opposite to said one direction, said valve members both being open to cause movement of the said pistons in said chambers respectively in opposite directions for a lesser amount of travel, and one of said chambers including stops to limit the travel of the pistons when the valves are both open to limit the piston movement to such lesser amount of travel.

5. A mechanism for converting fluid pressure to alternate rotary motion comprising, a housing having first and second spaced elongated chambers, the first chamber being cylindrically contoured and of uniform cross section, said second chamber including first and second spaced cylindrically contoured enlarged parts of a diameter equal to the diameter of the first chamber, said housing also having a gear chamber interposed between and communicating with both of the piston chambers, a gear disposed within the gear chamber and journaled for rotation therein, a cylindrically contoured solid rack piston reciprocably disposed in the first chamber and including a rack formed within such contour and in engagement with the gear, a segmental rack piston reciprocably disposed in the second chamber and in engagement with the gear, said segmental piston including a central portion and first and second piston cups disposed in the first and second enlarged parts respectively, the first and second cups being respectively abuttable against the ends of the central portion, means to introduce fluid under pressure to a first end of the first chamber to drive the solid piston to the second end of the chamber and thereby drive the segmental piston to the first end of the second chamber, means to introduce fluid under pressure to the second end of the first chamber to drive the solid piston to the first end of the chamber and thereby drive the segmental piston to the second end of the second chamber, and means to simultaneously introduce fluid under pressure to both ends of the first chamber and thereby drive both end cups to the inner ends of their respective enlarged parts and thereby drive the pistons and the gear to a central position.

6. In a mechanism for converting fluid pressure to alternate rotary motion having a housing having first and second spaced elongated chambers and a gear chamber interposed therebetween and communicating with both of the piston chambers, a gear disposed within the gear chamber and journaled for rotation therein and having a rack piston reciprocably disposed in each piston chamber and in engagement with the gear, the combination of, first and second fluid passage systems each in communication with one end of each of the piston chambers, first and second valves each having a valve chamber, each chamber having a bore, an intermediate counterbore, and an enlarged end counterbore; each valve having a valve body including a portion in sealing engagement with the associated bore, another portion in sealing engagement with the intermediate counterbore and a stem extending through the enlarged counterbore, each of said valve stems being selectively positionable across an outlet opening, said first system communication with the first piston chamber being through the first valve enlarged counterbore and the first valve port, said second system communication with the first piston chamber being through the second valve enlarged counterbore and the second valve port, said first system also being in communication with the first valve bore and the second valve intermediate counterbore, and the second system also being in communication with the second valve bore and the first valve intermediate counterbore.

7. A hydraulic actuator comprising a housing having a body portion and first and second spaced end caps, said body portion including first and second spaced and parallel piston chambers each extending from the first to the second end cap, said body portion including a gear chamber interposed between the piston chambers and in communication with both of the piston chambers, a gear disposed in the gear chamber and rotatively journaled in the housing, a first rack piston disposed in the first piston chamber and in engagement with the gear, said second piston chamber including spaced end portions of a diameter equal to the diameter of the first piston chamber, said second piston chamber also having a central portion of reduced diameter with respect to said end portions extending from one end portion to the other in axial alignment with both of said end portions, a second rack piston disposed in the second piston chamber central portion and in engagement with the gear, a pair of piston cups each disposed in one of the second chamber end portions and selectively abuttable with an end of the piston central portion, a first fluid pressure system including a pressure passage in direct communication with the first end of the first piston chamber, a second pressure system in direct communication with the other end of the first piston chamber, and valve means selectively connecting each of the pressure systems to an end of the second piston chamber.

8. The device of claim 7 wherein said valve means comprises two valves controlled by the pressure in the system and wherein one of the valves is open and the other closed when only one of the systems is pressurized and wherein both valves are open when both systems are pressurized.

9. A hydraulic actuator comprising a housing having a body portion and first and second spaced end caps, said body portion including first and second spaced and parallel piston chambers each extending from the first to the second end cap, said first piston chamber being a segmental chamber and said second end chamber being a solid piston chamber, said body portion including a gear chamber interposed between the piston chambers and in communication with both of the piston chambers, a gear disposed in the gear chamber and rotatively journaled in the housing, a solid piston including a rack disposed in the solid piston chamber and in engagement with the gear, said segmental chamber including spaced end portions of a diameter equal to the diameter of the solid piston chamber, said segmental chamber also having a central portion of reduced diameter with respect to said end portions and in axial alignment with both of said end portions, a segmental piston central portion including a rack disposed in the segmental piston chamber central portion and in engagement with the gear, a pair of piston cups each disposed in one of the segmental chamber end portions and selectively abuttable with an end of the piston central portion, O-rings interposed between each of the cups and each end of the solid piston and their respective chambers, said housing body portion including two valve chambers, each of the end caps having a port alignable with one valve chamber as an outlet port therefor; each of said valve chambers including a bore, an intermediate counterbore and an enlarged end counterbore; a valve body in each of said valve bores; each of said valve bodies including a cylinder portion in sealing engagement with the associated valve bore, an enlarged cylinder portion in sealing engagement with the associated intermediate counterbore and a valve stem projecting axially through the enlarged counterbore; each of said valve bodies having a first stop end abuttable with the associated valve bore and a seal carried at the opposite end, said seal being positionable to close the outlet port from the associated valve chamber, a first fluid pressure system including a pressure passage in direct communication with the first end of the solid piston bore and the intermediate bore of the first valve chamber, said first fluid system also being in direct communication with the bore of the other valve, a second fluid passage in direct communication with the second end of the solid piston chamber and the intermediate bore of said other valve, said second pressure system also being in direct communication with the cylindrical bore and the enlarged counterbore of said one valve, and said end caps including passages directly connecting each of the valve outlets with one end of the segmental piston bore.

10. A hydraulic actuator comprising a housing having a body portion and first and second spaced end caps, said body portion including first and second spaced and parallel piston chambers each extending from the first to the second end cap, said first piston chamber being a segmental chamber and said second end chamber being a solid piston chamber, said body portion including a gear chamber interposed between the piston chambers and in communication with both of the piston chambers, a gear disposed in the gear chamber and rotatively journaled in the housing, a solid piston including an integrally formed rack disposed in the solid piston chamber and in engagement with the gear, said segmental chamber including spaced end portions of a diameter equal to the diameter of the solid piston chamber, said segmental chamber also having a central portion of reduced diameter with respect to said end portions and in axial alignment with both of said end portions, a segmental piston central portion including an integrally formed rack disposed in the segmental piston chamber central portion and in engagement with the gear, a pair of piston cups each disposed in one of the segmental chamber end portions and selectively abuttable with an end of the piston central portion, O-rings interposed between each of the cups and each end of the solid piston and their respective chambers, said housing body portion including two valve chambers, each of the end caps having a port alignable with one valve chamber as an outlet port therefor; each of said valve chambers including a bore, an intermediate counterbore and an enlarged end counterbore; a valve body in each of said valve bores; each of said valve bodies including a cylinder portion in sealing engagement with the associated valve bore; an enlarged cylinder portion in sealing engagement with the associated intermediate counterbore and a valve stem projecting axially through the enlarged counterbore, each of said valve bodies having a first stop end abuttable with the associated valve bore and a seal carried at the opposite end, said seal being positionable to close the outlet port from the associated valve chamber, a first fluid pressure system including a pressure passage in direct communication with the first end of the solid piston bore and the intermediate bore of the first valve chamber, said first fluid system also being in direct communication with the bore of the other valve, a second fluid passage in direct communication with the second end of the solid piston chamber and the intermediate bore of said other valve, said second pressure system also being in direct communication with the cylindrical bore and the enlarged counterbore of said one valve, said end caps including passages directly connecting each of the valve outlets with one end of the segmental piston chamber, and a pair of bleed passages each connecting one of the intermediate bores with one of the segmental chambers.

11. A hydraulic actuator comprising a housing having a body portion and first and second spaced end caps, said body portion including first and second spaced and parallel piston chambers each extending from the first to the second end cap, said first piston chamber being a stepped chamber and said second piston chamber being a cylindrically contoured piston chamber, said body portion including a gear chamber interposed between the piston chambers and in communication with both of the piston chambers, a gear disposed in the gear chamber and rotatively journaled in the housing, a cylindrically contoured piston disposed in the solid piston chamber, the cylindrical piston including a rack between its ends and within the contour of the piston, the cylindrical piston rack being in engagement with the gear, said stepped chamber including spaced end portions of a diameter equal to the diameter of the cylindrical piston chamber, said stepped chamber also having a central portion of reduced diameter with respect to said end portions and in axial alignment with both of said end portions, a segmental piston central portion including a rack disposed in the segmental piston chamber central portion, the central portion rack being in engagement with the gear, a pair of piston cups each disposed in one of the stepped chamber end portions and selectively abuttable with an end of the piston central portion, seals interposed between each of the cups and each end of the solid piston and their respective chambers, said housing body portion including two valve chambers, the housing including first and second ports each connected with one valve chamber as an outlet port therefor; a first fluid pressure system including a pressure passage in direct communication with the first end of the cylindrical piston bore and both valve chambers, a second fluid passage in direct communication with the second end of the cylindrical piston chamber and both of said valve chambers, and said end caps including passages directly connecting each of the valve outlets with one end of the segmental piston bore, and first and second valve means in the valve chambers and responsive to fluid under pressure in the system, said first valve means being open and the second valve means closed when the first system is energized and the second deenergized, said second valve means being open and the first valve means being closed when the first system is deenergized and the second system is energized, and both valve means being open when both systems are energized.

12. A hydraulic actuator comprising a housing having a body portion and first and second spaced end caps, said body portion including first and second spaced end parallel piston chambers each extending from the first to the second end cap, first and second piston and rack means in the first and second chambers respectively, said body portion including a gear chamber interposed between the piston chambers and in communication with both of the piston chambers, a gear disposed in the gear chamber and rotatively journaled in the housing, the first and second piston and rack means each being in engagement with the gear, said housing body portion including two valve chambers, each of the end caps having a port alignable with one valve chamber as an outlet port therefor; each of said valve chambers including a bore, an intermediate counterbore and an enlarged end counterbore; a valve body in each of said valve bores; each of said valve bodies including a cylinder portion in sealing engagement with the associated valve bore, an enlarged cylinder portion in sealing engagement with the associated intermediate counterbore and a valve stem projecting axially through the enlarged counterbore; each of said valve bodies having a first stop end abuttable with the associated valve bore and a seal carried at the opposite end, said seal being positionable to close the outlet port from the associated valve chamber, a first fluid pressure system including a pressure passage in direct communication with the first end of the first piston chamber and the intermediate counterbore of one of the valve chambers, said first fluid system also being in direct communication with the valve bore and the enlarged counterbore of the other valve chamber, a second fluid passage in direct communication with the second end of the first piston chamber and the intermediate counterbore of said other valve chamber, said second pressure system also being in direct communication with the valve bore and the enlarged counterbore of said one valve chamber, and said end caps including passages directly connecting each of the valve outlets with one end of the second piston chamber.

13. In a multiple position actuator having a housing with spaced piston chambers and a connecting gear chamber, a gear in the gear chamber, a segmental piston in one chamber and a double ended piston in the other piston chamber and each piston including a rack engaging the gear, the combination of:
  (a) the housing defining first and second valve chambers, and first and second valved passages connecting the valve chambers to the ends of the piston chamber of the segmental piston;
  (b) the housing having first and second fluid passage systems communicating with the opposite ends of said one piston chamber and with the first and second valve chambers respectively;
  (c) first and second valving means in the first and second valve chambers respectively, and each having open and closed positions;
  (d) said first and second valved passages being in communication with the first and second passage systems respectively when the first and second valving means are open;
  (e) said first valving means being open whenever the first system is energized and closed whenever the second system is energized and the first system is deenergized; and,
  (f) said second valving means being open whenever the second system is energized and closed whenever the first system is energized and the second system is deenergized.

References Cited in the file of this patent
UNITED STATES PATENTS

| | | |
|---|---|---|
| 1,623,780 | Crocker | Apr. 5, 1922 |
| 1,806,669 | Campbell | May 26, 1931 |
| 2,671,431 | Zumbusch | Mar. 9, 1954 |
| 2,946,320 | Vogel | July 26, 1960 |
| 3,019,771 | Heese et al. | Feb. 6, 1962 |